Oct. 25, 1932.                R. S. BEATTY                1,884,526
                             POWER TAKE-OFF
                          Filed Aug. 18, 1931
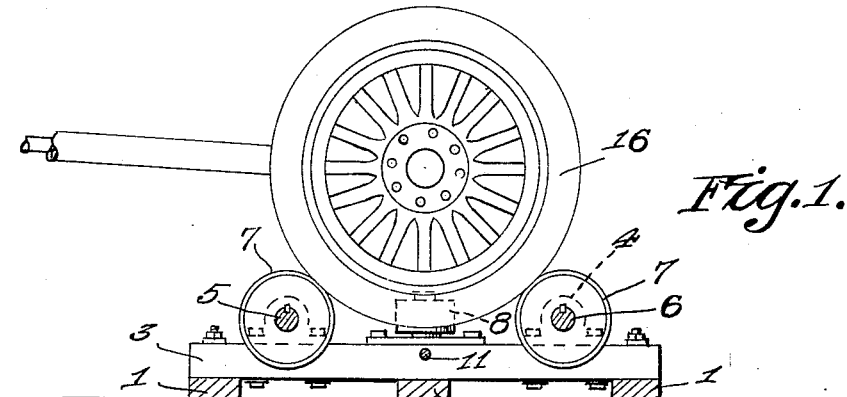
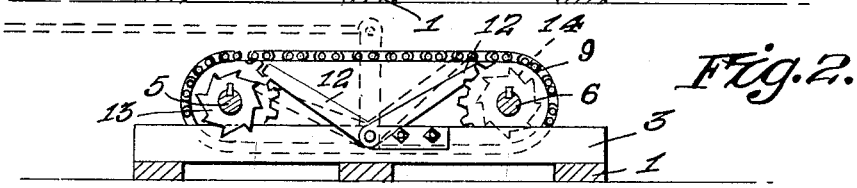
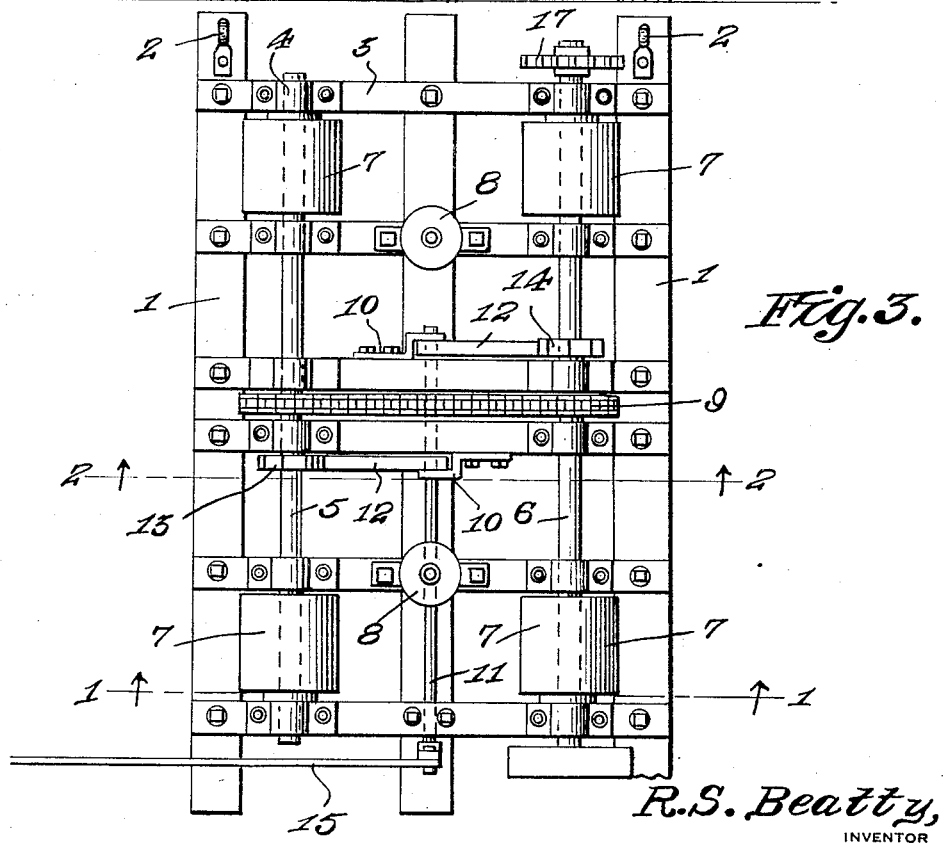
R. S. Beatty,
INVENTOR
BY Victor J. Evans & Co,
ATTORNEY Patented Oct. 25, 1932

1,884,526

UNITED STATES PATENT OFFICE

ROBERT S. BEATTY, OF TOMS RIVER, NEW JERSEY

POWER TAKE OFF

Application filed August 18, 1931. Serial No. 557,887.

My present invention has reference to a power take off, my general object being the provision of a power take off that includes a frame mounted on skids, and which frame has journaled thereon axles that carry rollers for the rear wheels of a truck or automobile, together with guide rollers for holding the wheels on the main and power take off rollers, together with means for stopping the turning of the rollers to permit of the automobile moving onto the power take off or moving therefrom in either direction.

The invention will be fully and comprehensively understood from a consideration of the following detailed description when read in connection with the accompanying drawing which forms part of the application, with the understanding, however, that the improvement is capable of extending application and is not confined to the exact showing of the drawing nor to the precise construction described and, therefore, such changes and modifications may be made therefrom as do not affect the spirit of the invention nor exceed the scope thereof as expressed in the appended claim.

In the drawing:

Figure 1 is a sectional view approximately on the line 1—1 of Figure 3.

Figure 2 is a sectional view approximately on the line 2—2 of Figure 3.

Figure 3 is a plan view.

As disclosed by the drawing my improved power take off comprises ground engaging elements in the nature of skids 1. Any desired number of spaced skids may be employed. The end skids, at one of their ends and upon their upper faces being provided with hooks or clevises 2 designed to have attached thereto a chain or the like whereby the device may be propelled to desired locations.

The frame of the improvement comprises cross beams 3 which are securely bolted to the skids, and the cross beams, adjacent to their ends, have fixed thereon bearings 4 for shafts 5 and 6, respectively. Fixed on the shafts, adjacent to the pairs of spaced end beams 3 there are rollers 7 and having their vertically disposed shafts journaled on the inner end beams 3 there are rollers or wheels 8.

Each of the shafts 5 has fixed thereon a sprocket wheel over which is trained an endless sprocket chain 9. The sprocket chain is arranged between the intermediate beams 3 and the outer faces of these spaced intermediate beams have fixed thereon oppositely directed angle brackets 10 that afford bearings for a shaft 11. The shaft has fixed thereon upwardly inclined oppositely directed dogs 12, respectively, and either of these dogs is designed to be swung when the shaft 11 is turned in opposite directions into engagement with ratchet wheels 13 and 14 that are fixed on the respective shafts 5 and 6. The shaft 11 is operated by a lever 15. The dogs are normally in a neutral position, that is, the dogs are not in engagement with either of the ratchet wheels 13 or 14. A swinging of the lever 15 in opposite directions will, however, bring the dogs into engagement with one of the ratchet wheels 13 or 14 and in so doing lock and prevent the turning of the shafts 5 and 6 in one direction or the other. This permits the rear or drive wheel 16 of a truck or like motor propelled vehicle being moved on to the rolls 7 from either side of the power take off, and when the wheels 16 are in proper position to rest on the rolls 7 and to likewise be contacted by the guide wheels 8, the motor of the vehicle is operated to turn the wheels 16 and consequently turn the shafts 5 and 6, after the lever has been operated to turn the shaft 11 to bring the dogs out of engagement with the ratchet wheel and to arrange both of said dogs in non-active or non-ratchet wheel engaging position.

In the showing of the drawing the shaft 6 is provided with a sprocket wheel 17 designed to be attached to a sprocket chain that operates a suitable mechanism. A similar sprocket wheel or pulley may be attached to the shaft 5 if desired. By swinging the lever to cause the dogs 12 to engage with the proper ratchet wheel 13 or 14 the truck may be moved off of the device either in forward or backward direction. The uses of the take off are manifold and it is not deemed necessary to herein set forth any particular mechanism to be driven by the shafts 5 and 6. It is thought the foregoing description when read in connection with the accompanying drawing will fully and clearly set forth my construction and its many advantages so that further detailed description will not be required. Obviously I do not wish to be restricted to the precise details herein set forth and, therefore, hold myself entitled to make such changes therefrom as fairly fall within the scope of what I claim.

It will be apparent that the power is directly derived from the truck, that no clutches or like elements are employed and that the speed of the shafts is controlled entirely by the engine, which imparts thereto a reliable and steady power of various speeds.

Having described the invention, I claim:

A power take off including skids, a frame comprising transversely arranged spaced beams which are fixed on the skids, spaced longitudinally arranged shafts journaled in bearings on the beams and having fixed rollers thereon adjacent the ends thereof, said rollers designed to receive thereon the driven wheels of a truck or like motor operated vehicle, means for preventing the turning of either of the rollers when the wheels of the vehicle are arranged thereon and said means being releasable when the wheels are positioned on the rolls, a belt or chain drive element on one or both of the shafts, and vertically disposed rollers journaled on the beams to contact with the inner sides of the driven wheels of the vehicle, said shaft stopping means comprising sprocket wheels fixed on the shafts and an endless chain trained therearound, ratchet wheels fixed on the shafts, brackets supported upon the inner beams, oppositely directed upwardly inclined dogs having their active ends disposed above and normally out of engagement with the ratchet wheels, a shaft journaled through the brackets and to which the inclined dogs are fixedly secured, and a lever connected with the shaft operable for turning the said shaft to bring either one of the dogs to engage with its ratchet wheel and to bring the second dog further away from the ratchet wheel to be engaged thereby.

In testimony whereof I affix my signature.

ROBERT S. BEATTY.